United States Patent
Iancu et al.

(10) Patent No.: US 7,209,529 B2
(45) Date of Patent: Apr. 24, 2007

(54) DOPPLER COMPENSATED RECEIVER

(75) Inventors: Daniel Iancu, Pleasantville, NY (US);
John Glossner, Carmel, NY (US);
Erdem Hokenek, Yorktown Heights,
NY (US); Mayan Moudgill, White
Plains, NY (US); Vladimir Kotlyar,
Stamford, CT (US)

(73) Assignee: Sandbridge Technologies, Inc., White Plains, NY (US)

( * ) Notice: Subject to any disclaimer, the term of this patent is extended or adjusted under 35 U.S.C. 154(b) by 738 days.

(21) Appl. No.: 10/617,188

(22) Filed: Jul. 10, 2003

(65) Prior Publication Data

US 2005/0007277 A1    Jan. 13, 2005

(51) Int. Cl.
*H03D 1/04*    (2006.01)
(52) U.S. Cl. .................. 375/346; 375/285; 367/904; 367/94; 367/90
(58) Field of Classification Search ............... 375/346, 375/285; 367/90, 94, 904, 134; 306/90, 306/94; 370/505; 455/75
See application file for complete search history.

(56) References Cited

U.S. PATENT DOCUMENTS

| | | | | |
|---|---|---|---|---|
| 5,130,952 | A | * | 7/1992 | Feintuch et al. ............ 367/135 |
| 5,719,944 | A | * | 2/1998 | Banerjea ..................... 381/61 |
| 5,732,044 | A | * | 3/1998 | Jarvis ......................... 367/134 |
| 5,901,171 | A | | 5/1999 | Kohli et al. |
| 6,044,105 | A | | 3/2000 | Gronemeyer |
| 6,633,617 | B1 | * | 10/2003 | Cooklev ...................... 375/344 |
| 2003/0016168 | A1 | | 1/2003 | Jandrell |

* cited by examiner

*Primary Examiner*—Dac Ha
*Assistant Examiner*—Ted M. Wang
(74) *Attorney, Agent, or Firm*—Barnes & Thornburg LLP

(57) ABSTRACT

A receiver includes a controller which receives A/D sampled input signals and shifts the sampled digital signal to compensate for Doppler effect in the input signal prior to demodulation. The controller compensates for a Doppler increased frequency by shifting the sampled digital signal so as to skip a sample period every n samples. This may be achieved by decreasing a cycle of m samples by one sample period every n samples. The controller compensates for a Doppler decreased frequency by shifting the sampled digital signal so as to add a sample period every n samples. This may be achieved by repeating a sample every n samples to shift the sampled digital signal. The compensation is performed in software on a multi-threaded processor.

25 Claims, 3 Drawing Sheets

DOPPLER COMPENSATED RECEIVER

BACKGROUND AND SUMMARY OF THE INVENTION

The present invention relates generally to receivers and more specifically to a receiver which compensates for the Doppler effect in the received signal.

Due to the computational complexity, the Global Positioning Satellite (GPS) receivers have been implemented in hardware, employing multiple parallel channels. Usually, each channel is responsible for tracking and demodulating one satellite. In some more sophisticated designs, for economic reasons, one channel can be time shared by more than one satellite. In the case of multi-protocol communication systems, the hardware implementation becomes less attractive due to extra chip cost and PC board area consumed.

Although the present receiver will be described in the context of a GPS receiver, the principles are applicable to any receiver which has a Doppler effect in the received signal resulting from the relative movement of the transmitter and the receiver.

The received GPS signal can be viewed as a superposition of $N_s$ DS-CDMA signals coming from $N_s$ visible satellites. Each satellite has its unique signature and slightly different carrier frequency due to the Doppler effect, even though they transmit at the same carrier frequency f. The composite GPS code signal can be modeled as (see Elliot D. Kaplan, *Understanding GPS Principles and Applications*, Artech House Inc. (1996)):

$$s(t) = \sum_{i=0}^{N_s-1} \sum_{n=-\infty}^{+\infty} \sum_{k=-\infty}^{+\infty} A_i d_i[k] g\left(t - k\frac{N_p}{f_i}\right) \quad (1)$$

$$g\left(t - n\frac{1}{f_i}\right) P_i[(n + n_i') \% N_p] \cdot \cos(2\pi f_i t + \varphi_i)$$

wherein: $A_i$ is the amplitude for satellite i, d[k] is the data in the $k^t$ millisecond, $f_i = 1/T_i$ is the carrier frequency for the $i^{th}$ satellite, $g(t-mT_i) = \sigma(t-mT_i) \sigma[(m+1)T_i-t]$ is the window function, $$\sigma(t) = \begin{cases} 1 & \text{for } t \geq 0 \\ 0 & \text{for } t < 0 \end{cases}$$

is the unit step function, $P_i[n]$ the is the $n^{th}$ chip in the $k^{th}$ millisecond of the C/A code for satellite i, % means modulus operation, $N_p$ is the number of visible satellites and $\phi_i$ is the phase shift. In equation (1), the noise term has been deliberately ignored for commodity.

After multiplying the composite signal s(t) by a window function of the carrier frequency f=1/T and summing, equation (1) becomes:

$$\chi(t) = \sum_{i=0}^{N_s-1} A_i d_i[k] P_i[(n + n_i') \% N_p] \cdot \quad (2)$$

$$g\left(t - n\frac{1}{\max(f, f_i)}\right) \cdot \cos(2\pi f_i t + \varphi_i) \cdot e^{-j2\pi ft}$$

The integral of χ(t) over the entire time axis represents the Fourier transform of $\cos(2\pi f_i t + \phi_i)$ times a constant:

$$\int_{-\infty}^{+\infty} \chi(t)dt = \int_{n \cdot T}^{(n+1)\max(T,T_i)} \chi(t)dt \quad (3)$$

$$= \int_{n \cdot T}^{(n+1)\max(T,T_i)} dt \sum_{i=0}^{N_s-1} A_i d_i[k] P_i[(n + n_i') \% N_p] \cdot$$

$$\cos(2\pi f_i t + \varphi_i) \cdot e^{-j2\pi ft}$$

$$= \int_{n \cdot T}^{(n+1)\max(T,T_0)} dt A_0 d_0[k] P_0[(n + n_0') \% N_p] \cdot$$

$$\cos(2\pi f_0 t + \varphi_0) \cdot e^{-j2\pi ft} +$$

$$\int_{n \cdot T}^{(n+1)\max(T,T_1)} dt A_1 d_1[k] P_1[(n + n_1') \% N_p] \cdot$$

$$\cos(2\pi f_1 t + \varphi_1) \cdot e^{-j2\pi ft} + \ldots +$$

$$\int_{n \cdot T}^{(n+1)\max(T,T_{N_s-1})} dt A_{N_s-1} d_{N_s-1}[k]$$

$$P_{N_s-1}[(n + n_{N_s-1}') \% N_p] \cdot$$

$$\cos(2\pi f_{N_s-1} t + \varphi_{N_s-1}) \cdot e^{-j2\pi ft}$$

In order to minimize the detection error for a particular satellite i resulting from the Doppler shift as well as for the phase shift, the following must be true $f-f_i=0$ and $\phi_i=0$ for each satellite. Conforming to the Fourier transform shifting property, the condition $f-f_i=0$ can be achieved either through frequency or time domain shift.

In a hardware implementation, the carrier is tracked by advancing or retarding the local oscillator LO frequency and phase (frequency domain shift) conforming to the output of a Phase Locked Loop (PLL) circuit. The integrals in equation (3) are performed in parallel, each by a separate channel as shown in FIG. 1. The signal from the RF front end is digitized, demodulated and correlated against the satellite signature (PN number), and the results are transferred to the digital signal processor DSP for further processing. There is also a PLL block and local oscillator LO associated with each channel. Depending on cost/performance, a GPS receiver can incorporate from 4 to 12 channels.

The hardware architecture of the present receiver uses fewer hardware components and allows an efficient software implementation. It provides both flexibility and low power consumption.

The receiver includes an antenna for receiving a signal from a transmitter which is moving relative to the receiver. An A/D converter, connected to the antenna, provides a sampled digital signal from the input signal A controller receives and demodulates the sampled digital signal from the A/D converter. The controller shifts the sampled digital signal to compensate for Doppler effect in the input signal prior to demodulation. The controller compensates for a Doppler increased frequency by shifting the sampled digital signal so as to skip a sample period every n samples. This may be achieved by decreasing a cycle of m samples by one sample period every n samples. The controller compensates for a Doppler decreased frequency by shifting the sampled digital signal so as to add a sample period every n samples. This may be achieved by repeating a sample every n samples to shift the sampled digital signal.

The sampled digital signal is shifted until a known transmission frequency of the transmitter has been modified to match the frequency of the input signal. The controller matches the phase of the sampled digital signal to the phase of the input signal using, for example, a phase locked loop. The controller includes software for shifting and demodulating the sampled digital signal and the phase locked loop. The controller identifies how many transmitters' transmissions are in the input signal and demodulates and shifts the sampled data for each identified transmitter, in parallel.

These and other aspects of the present invention will become apparent from the following detailed description of the invention, when considered in conjunction with accompanying drawings.

DETAILED DESCRIPTION OF THE PREFERRED EMBODIMENTS

Figure 2:
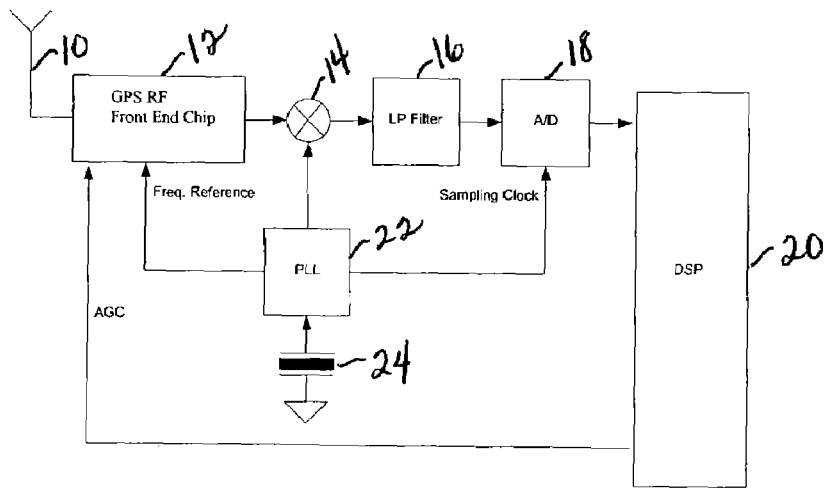
FIG. 2 is a block diagram of a receiver according to the principles of the present invention.

Hardware components of a receiver designed for software implementation of the Doppler compensated receivers are illustrated in FIG. 2. The signal received on antenna 10 is connected to a GPS RF front end chip 12. The output of the GPS chip 12 is provided to a demodulator 14. The output of the demodulator 14 is provided through a low pass filter 16 to analog to digital (A/D) converter 18. The digital signal is then provided to controller 20, shown as a digital signal processor (DSP). The received signal is Doppler and phase corrected and demodulated by the controller 20. The controller 20 also provides the automatic gain control AGC to the GPS chip 12. The reference frequency of GPS chip 12 and demodulator 14 and the sampling rate of the A/D converter 18 are set by a clock signal from phase locked loop PLL 22 driven by a crystal oscillator 24. Preferably, the crystal oscillator 24 is a high-precision, low drift oscillator and may also be used as a clock for the controller 20.

The received signal is a composite signal of transmissions from one or more transmitters which are in view of the receiver. Even though each of the transmitters is transmitting at the same carrier frequency, because of the Doppler effect, they will have a different received frequency, which generally is either shifted to be higher or lower than the common carrier frequency. To adjust for the Doppler effect, the controller 20 shifts the data back and forth by a number of samples. The number of samples to be shifted is calculated based on the known or assumed Doppler frequency or Doppler effect. This is done on a satellite-by-satellite basis. As will be discussed, in the present controller 20, these are done in parallel on a multi-threaded digital signal processor. One such processor that is capable of performing this in software is the Sandbridge Technologies Multi-Threaded SB9600 Processor. Other processors may be used.

Figure 3:
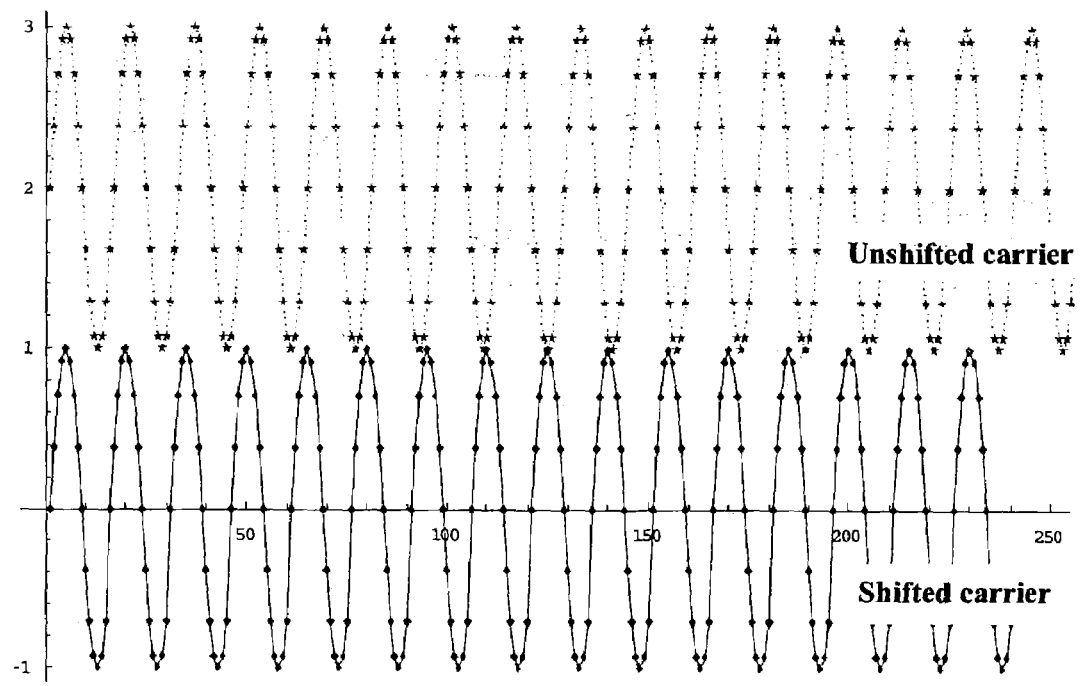
FIG. 3 is a pair of graphs comparing a non-shifted-to shifted sign wave for a Doppler increased frequency according to the principles of the present invention.

If the received signal has been increased in frequency because of the Doppler effect, the data is shifted forward one sample period for every n samples. This may be accomplished by skipping a cycle period every n samples. This, in effect, decreases a cycle of m samples by one sample period every n samples. It increases the frequency of the received data to match the received Doppler increased frequency. FIG. 3 shows a pair of curves that illustrates this phenomena. The top sine wave illustrates the unshifted carrier. There are 16 data bits per single cycle. As illustrated in the bottom sine wave, the $16^{th}$ sample period is skipped, and the $16^{th}$ data bit becomes the first data bit of the next cycle. In the illustration of FIG. 3, this occurs once every cycle. This has the effect of decreasing the cycle of 16 samples to 15 samples every 15 samples.

Figure 4:
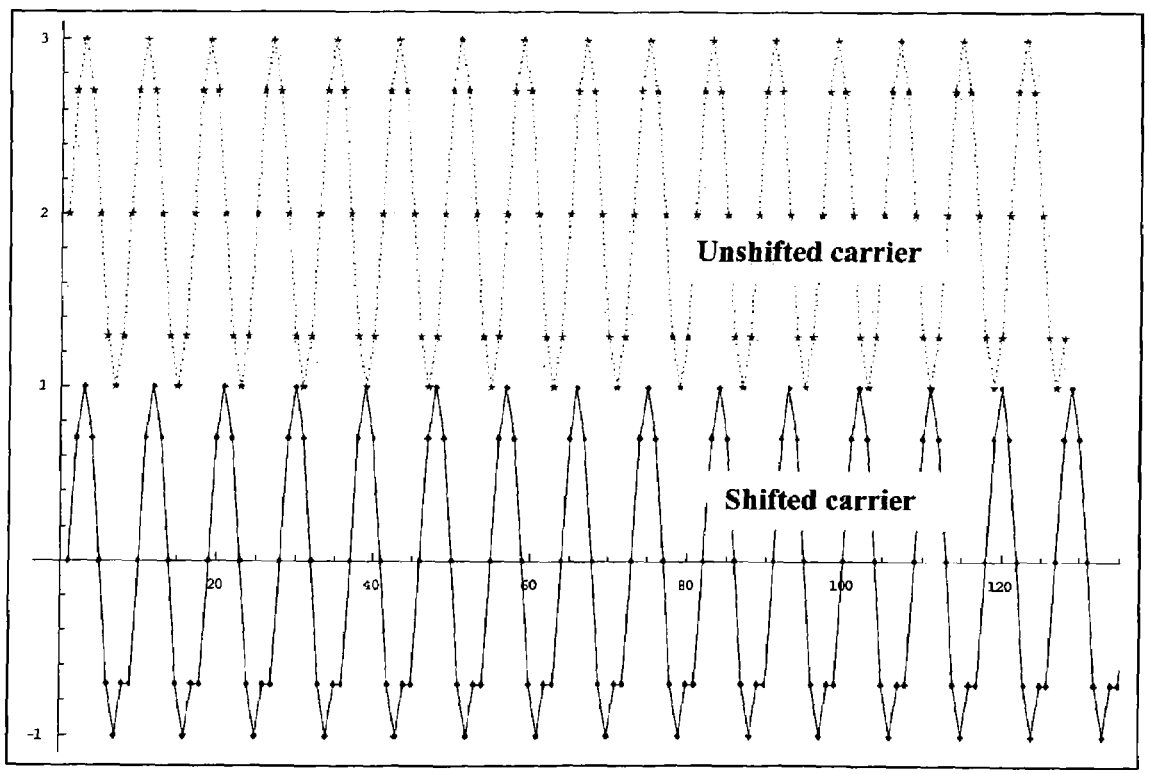
FIG. 4 is a pair of graphs comparing a non-shifted to shifted sign wave for a Doppler decreased frequency according to the principles of the present invention.

The Doppler effect may be a Doppler decreased frequency. The shifted data required for a decreased frequency is performed by adding a sample period every n samples. This may be achieved by repeating a sample every n samples to produce the shift. This has the effect of increasing the number of samples for a cycle, thereby decreasing the frequency. This is illustrated in FIG. 4. In the top sine wave, there are eight samples per cycle. In the shifted sine wave at the bottom, there are nine samples per cycle. The extra, inserted sample period is produced by repeating the eighth sample, for example. This eighth sample per cycle is repeated every cycle.

It should be noted that the shifting either to increase or decrease the frequency may occur more than once per cycle or may occur in a greater period than one cycle.

Figure 1:
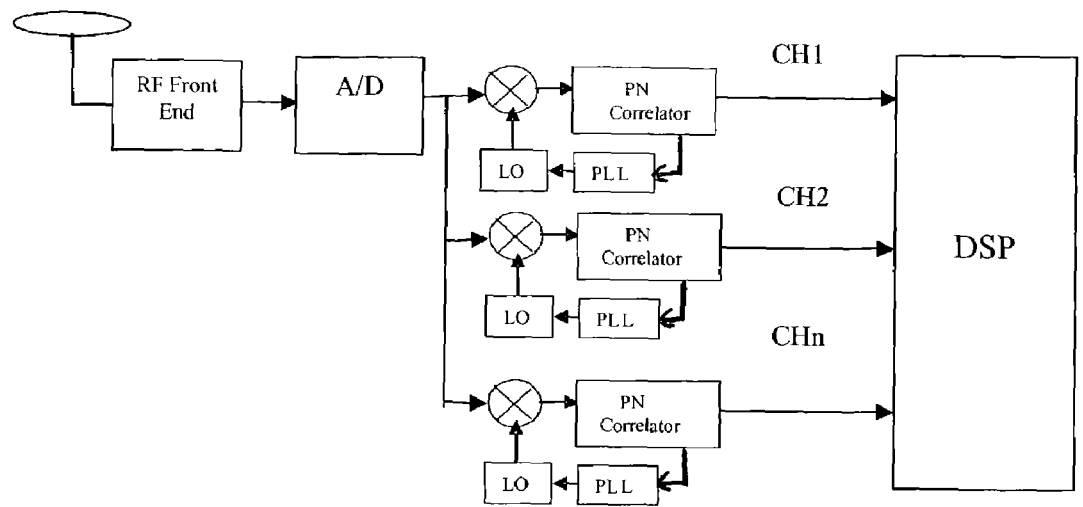
FIG. 1 is a block diagram of a prior art receiver implemented in hardware.

While in the hardware implementation of FIG. 1, reducing the difference in frequency to zero can be easily achieved by a continuously variable voltage controlled oscillator (VCO) used in place of the local oscillator (LO). However, this frequency condition cannot be achieved in software due to the finite sampling rate. The shifting in the time domain will introduce spurious frequencies, which will increase the detection error. To keep the detection error low, the sampling rate needs to be high. In studying this error, it has been determined that the total energy of the spurious frequencies converges to zero as $1/n^2$, where n is the number of oversamples per cycle. (If n cycles per chip in k samples per cycle, then the total number of samples/chip will be n*k.) Preferably, the number of samples is at least eight per cycle of input signal to minimize the introduce error.

Figure 5:
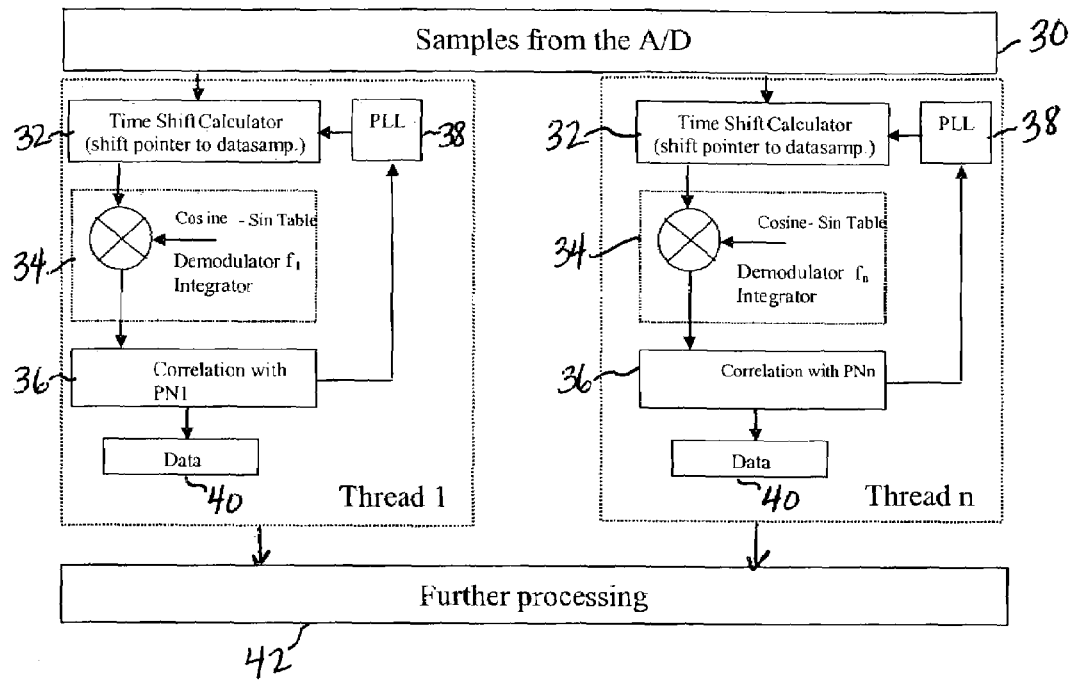
FIG. 5 is a block diagram of a software implementation of the control portion of FIG. 2 incorporating the principles of the present invention.
Figure 6:
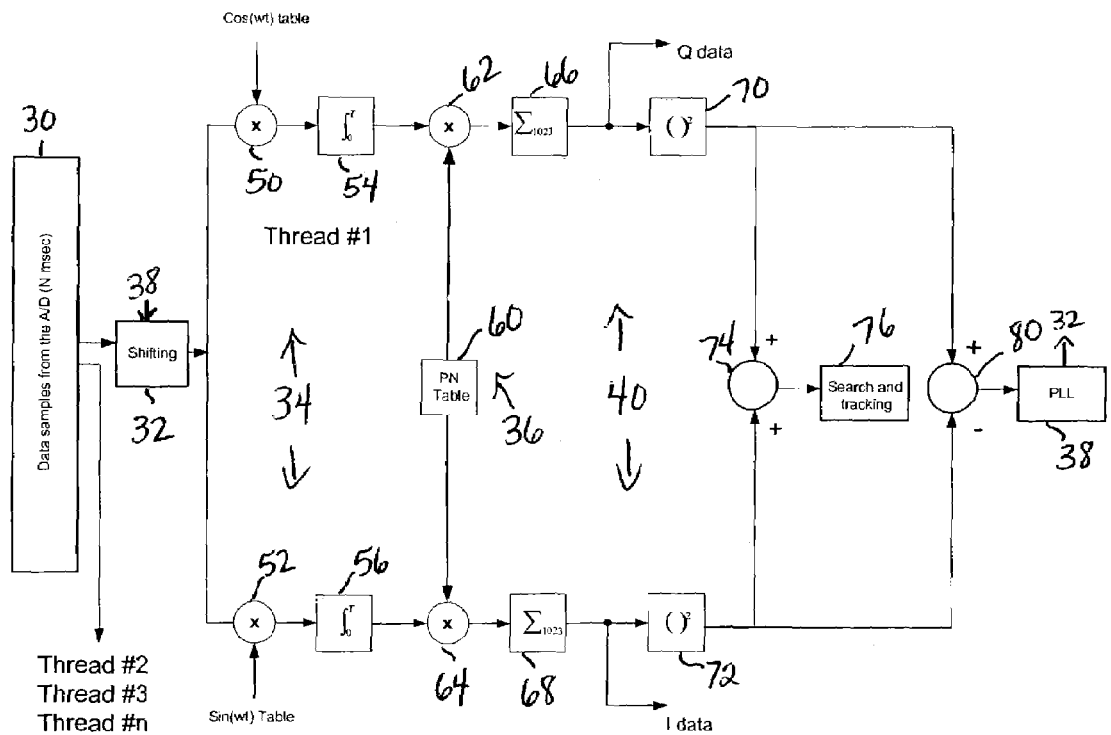
FIG. 6 is a detailed block diagram of a software implementation of the control portion of FIG. 3 incorporating the principles of the present invention.

A flow chart for the software implementation of the shifting demodulation correlation and phase adjustment is illustrated in FIGS. 5 and 6. The sampled digital signal from the A/D converter 18 is stored in, for example, a buffer 30. For example, a few milliseconds length of sampled data is stored or buffered. This information is then separately processed by a thread process, which includes more than one thread if the processing requirements exceed the capabilities of one thread, for each of the identified transmitters. Each thread includes a time shift calculator 32 to shift the data either forward or back to increase or decrease their frequency to match the frequency of the received signal taking into account the Doppler effect. The results are then demodulated and integrated at 34. This is produced by multiplying by a sine and cosine table. The results are correlated at 36 with the PN sequence of the particular transmitter. This information is used by phase locked loop 38 to achieve a zero phase by providing input to the time shift calculator 32. The information of each thread is then provided to further processing at 42. As illustrated in FIG. 2, the crystal oscillator 24 is used in combination with buffer 30 to precisely time the information in the buffer with the data string.

The time shift calculator 32 may be achieved by shifting the pointer to the sampled data stored in buffer 30. Thus, to repeat a sample and thereby decrease the frequency, the pointer would not move for the next sample period. To increase the frequency, the pointer would not provide any information for one data point and in effect start the next cycle with the skipped data sample.

The following is an example of an algorithm for the Doppler frequency correction and the demodulator setup in order to keep the incoming data continuity.

Definitions:
N is the number of total samples acquired in the data buffer in a time interval t.
$N_{spc}$, is the number of samples per cycle.
$f_d$ is the Doppler frequency.
n is the number of cycles per one sample repeat or skip.

$$n = \frac{N}{N_{spc}^2 \cdot f_d \cdot t} \quad (4)$$

As an example where N=1309440, the number of samples per 80 milliseconds of data at two cycles per chip and eight samples per cycle (1023 chips×8×2×80); $N_{spc}$=8; $f_d$=50 Hz; and t=0.08 sec., the number of cycles per one sample repeat or skip is n=5115 cycles.

When demodulating for multiple carriers, on fixed length data buffers, it is important to keep the data continuity to avoid the loss of synchronization. For example, if one sample is lost at each buffer of data, after 16 buffers at 16 samples per chip, the received data will be one chip off. Suppose a positive Doppler frequency corresponding to one sample shift per cycle. Suppose the data buffer is 40 samples long, and the number of samples per cycle is 8. The following shows the sample number in the data buffer, above the line and the sample number after shifting for a positive Doppler frequency, below the line.

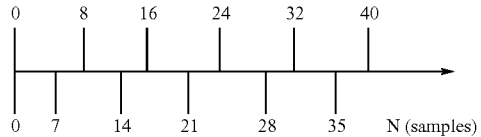

The demodulator, at eight samples per cycle with no Doppler shift, performs the dot product between the first eight samples and the eight sine-cosine sample values followed by the dot product of the next eight samples starting with sample number 8 than the next 8 samples starting with number 16 and so on. If there is a Doppler shift corresponding to one sample per cycle, then the first dot product is from the samples 0 through 7, the second from 8 to 14 and so on.

The sample number for each dot product increases with 7, this suggests an arithmetic series with ratio 7 and first term 7.

The calculation of the demodulation length on a fixed length of data buffer when demodulating for multiple carriers at small frequency difference is the following:

Definitions:
r is the arithmetic series ratio.
N is the number of samples in a fixed length interval.
$a_1$ is the first term in the series.
$a_n$ is the last term in the series, n less than or equal to N.
n is the number of demodulation intervals.
x is the number of cycles per one sample shift.
$n_{lo}$ is the number of samples left over.
$r=N_{spc}x-1$ for positive Doppler.
$r=N_{spc}x+1$ for negative Doppler.

Most likely, the demodulation will not end at the last sample position in the data buffer, and there will be a few samples left over. The leftover samples plus a number of samples from the next data buffer, such that the total number of samples will be eight, will constitute the first dot product in the next time interval.

The demodulation length will be calculated as:

$$n' = \text{Floor}\left[\frac{N + n_{lo} - r}{r} + 1\right]$$

$$n = \text{Floor}\left[\frac{N + n_{lo} + n}{N_{spc}}\right]$$

$$n_{lo} = [N + n_{lo} + n] \% N_{spc}$$

for positive Doppler, and:

$$n' = \text{Floor}\left[\frac{N + n_{lo} - r}{r} + 1\right]$$

$$n = \text{Floor}\left[\frac{N + n_{lo} - n}{N_{spc}}\right]$$

$$n_{lo} = [N + n_{lo} - n] \% N_{spc}$$

where, the Floor operation takes the flooring and % is the modulus operation.

A more specific example for a thread process is illustrated in FIG. 6. Again, the input information is provided in a buffer 30 and fed to individual shifters 32. The shifted data is then multiplied by values from the cosine and sine table at 50 and 52, respectively. The results are then integrated at 54 and 56, respectively. The information is correlated with the PN sequence by multiplying the integrated results with the value from the PN table 60 at multiplier 62 and 64. The results are summed at 66 and 68 and provide the Q data and I data outputs, respectively. The results are then squared at 70 and 72, summed at 74 and provided to a searching and tracking step 76. Searching and tracking methods are described in Elliot D. Kaplan's "Understanding GPS applications and principles," Artech House Inc. (1996). The outputs of the individual branches from 70 and 72 are also added and subtracted, respectively, and provided to the phase locked loop 38.

The controller 20 will determine the number of transmitters that are in the received signal. This is known as a "sky search" and is well-known in the prior art. Once the number of transmitters in the received signal and their distinctive PN sequence is identified, the number of parallel threads are set up. The individual thread then follows that transmitter and adjusts the received frequencies as the transmitter moves relative to the receiver.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A communication receiver comprising:
an antenna for receiving an input signal from a transmitter which is moving relative to the receiver;
an A/D converter, connected to the antenna, for providing a sampled digital signal from the input signal; and
a controller for receiving and demodulating the sampled digital signal from the A/D converter, and the controller, prior to demodulation of the sampled digital signal, compensates for a Doppler increased frequency by decreasing a cycle of m samples by one sample period every n samples and compensates for a Doppler decreased frequency by increasing the cycle of m samples by one sample period every n samples, where m and n are integers.

2. The receiver according to claim 1, wherein the controller compensates for the Doppler increased frequency by skipping a sample period every n samples.

3. The receiver according to claim 1, wherein the input signal has a cycle of m samples, and n is equal to or greater than m.

4. The receiver according to claim 1, wherein the controller compensates for the Doppler increased frequency by shifting the sampled digital signal forward one sample period every n samples.

5. The receiver according to claim 1, wherein the controller compensates for the Doppler decreased frequency by adding a sample period every n samples.

6. The receiver according to claim 1, wherein the controller compensates for the Doppler decreased frequency by repeating a sample every n samples.

7. The receiver according to claim 1, wherein the controller correlates and tracks a known transmission frequency of the transmitter to the frequency of the input signal.

8. The receiver according to claim 7, wherein the controller matches the phase of the sampled digital signal to the known transmission frequency of the transmitter.

9. The receiver according to claim 8, wherein the controller includes a phase locked loop for matching the phases.

10. The receiver according to claim 9, wherein the controller includes software for shifting and demodulating the sampled digital signal and the phase locked loop.

11. The receiver according to claim 1, wherein the controller includes software for shifting and demodulating the sampled digital signal.

12. The receiver according to claim 1, wherein the controller integrates the demodulated sampled digital signals using a sine-cosine table.

13. The receiver according to claim 12, wherein the controller correlates the integrated digital signal to stored PN sequences.

14. The receiver according to claim 1, wherein the controller identifies how many transmitters' transmission are in the input signal and compensates and demodulates the sampled data for each identified transmitter, in parallel.

15. The receiver according to claim 14, wherein the controller is a multi-threaded processor.

16. The receiver according to claim 1, wherein the input signal is sampled at least eight times per cycle of the input signal.

17. A method of compensating for a Doppler change of frequency in a communication receiver comprising:
converting a received signal into a sampled digital signal;
determining the Doppler change of frequency from a known transmission frequency;
for a Doppler increased frequency, decreasing a cycle of m samples by one sample period every n samples and for a Doppler decreased frequency, increasing a cycle of m samples by one sample period every n samples, where m and n are integers; and
demodulating the compensated sampled digital signal.

18. The method according to claim 17, wherein for the Doppler increased frequency, skipping a sample period every n samples.

19. The method according to claim 17, wherein the input signal has a cycle of m samples, and n is equal to or greater than m.

20. The method according to claim 17, wherein for the Doppler increased frequency, shifting the sampled digital signal forward one sample period every n samples.

21. The method according to claim 17, wherein for the Doppler decreased frequency, adding a sample period every n samples.

22. The method according to claim 17, wherein for the Doppler decreased frequency, repeating a sample every n samples to shift the sampled digital signal.

23. The method according to claim 17, including identifying how many transmitters' transmission are in the input signal and shifting and demodulating the sampled data for each identified transmitter, in parallel.

24. The method according to claim 23, wherein the method is performed on a multi-threaded processor.

25. The method according to claim 17, wherein the input signal is sampled at least eight times per cycle of the input signal.

* * * * *